United States Patent [19]
Holliday

[11] Patent Number: 5,355,567
[45] Date of Patent: Oct. 18, 1994

[54] PROCESS FOR PREPARING ENGINEERED FIBER BLEND

[75] Inventor: Richard C. Holliday, Matthews, N.C.

[73] Assignee: Hoechst Celanese Corporation, Somerville, N.J.

[21] Appl. No.: 993,189

[22] Filed: Dec. 18, 1992

[51] Int. Cl.⁵ .................. D02G 3/04; D02G 1/20; B32B 17/04; B65H 81/00

[52] U.S. Cl. .................. 28/282; 28/219; 19/299; 156/166; 156/148; 156/309.6; 264/257; 264/258

[58] Field of Search ........... 28/282, 283, 271, 219; 156/166, 180, 181, 148, 309.6; 57/908; 264/257, 258; 19/299, 144, 145, 145.5

[56] References Cited

U.S. PATENT DOCUMENTS

| | | | |
|---|---|---|---|
| 3,737,352 | 6/1973 | Avis et al. | 156/180 X |
| 3,796,035 | 3/1974 | Watson | 28/283 X |
| 4,410,385 | 10/1983 | Murphy et al. | 156/181 |
| 4,799,985 | 1/1989 | McMahon et al. | |
| 4,800,113 | 1/1989 | O'Connor | 156/148 X |
| 4,818,318 | 4/1989 | McMahon et al. | |
| 4,871,491 | 10/1989 | McMahon et al. | |
| 4,874,563 | 10/1989 | McMahon et al. | |
| 4,919,739 | 4/1990 | Dyksterhouse et al. | 156/180 X |
| 5,000,807 | 3/1991 | Stuart | 156/166 |
| 5,011,523 | 4/1991 | Roncato et al. | 65/2 |
| 5,176,868 | 1/1993 | Davis | 264/257 |
| 5,227,236 | 7/1993 | Handermann | 428/361 |
| 5,241,731 | 9/1993 | Stuart | 156/166 X |

FOREIGN PATENT DOCUMENTS

| | | | |
|---|---|---|---|
| 473861 | 2/1972 | Japan | 28/282 |
| 1200342 | 6/1967 | United Kingdom | |
| 2105247 | 3/1983 | United Kingdom | |

OTHER PUBLICATIONS

C. J. A. Slater; Research Disclosure 20,239, Feb. 1991.
Baucom, R., NASA Technical Brief Fall 1982 p. 98.

Primary Examiner—Jeff H. Aftergut
Attorney, Agent, or Firm—R. H. Hammer, III

[57] ABSTRACT

The invention is directed to a process for preparing a blended tow of thermoplastic and reinforcing fibers. The process of the invention includes the steps of forming a substantially planar spaced array of thermoplastic multifilament yarns and superimposing the spaced array of separate yarns onto a spread tow of reinforcing fibers. The resulting planar mixed yarn is then gathered into a tow having a nonuniform distribution of thermoplastic fibers throughout the tow. The tow is useful in forming fiber-reinforced composite articles by shaping the tow into a desired form and then heating the shaped tow to melt the thermoplastic fibers which, in turn, form a plastic matrix which is reinforced by the reinforcing fibers.

25 Claims, 3 Drawing Sheets

PROCESS FOR PREPARING ENGINEERED FIBER BLEND

FIELD OF THE INVENTION

The invention is directed to a process for preparing a blend of engineered fibers. More specifically, the invention is directed to a process for preparing a blend of thermoplastic matrix fibers and reinforcing fibers for use in preparing fiber-reinforced composite structures.

BACKGROUND OF THE INVENTION

Fiber-reinforced composites structures are used in a variety of automotive, aerospace and like industries where strong and durable, but lightweight, products and components are desirable. In general, these products are manufactured by blending reinforcing fibers with plastic materials, forming the mixture into a desired shape, and then consolidating the plastic materials into a solid matrix encompassing the reinforcing fibers. The reinforcing fibers provide substantial strength to the composite product.

There are a number of different methods and materials which are successfully used to form composite products. One such method involves the use of a blended tow of thermoplastic, or matrix, fibers and reinforcing fibers, such as carbon fibers. The tow, which is a loose, bundle of continuous fibers, both thermoplastic and reinforcing fibers, is formed into the shape of the desired product, for example, by winding the tow around a mandrel or by placing the tow into a shaped cavity, or by like methods- The entire structure is then heated in order to melt the thermoplastic fibers. The melted thermoplastic polymer then forms a matrix which surrounds and is reinforced by the reinforcing fibers.

The use of intimately admixed tows of reinforcing fibers and thermoplastic fibers for the preparation of composite articles and the preparation of such intimately admixed tows are disclosed, for example, in: SJA Slater; Research Disclosure 20239, February 1991; and in Baucom, Robert, NASA Tech. Brief, Fall, 1982, page 98. Similarly, British Patent 1,200,342 to Davis discloses various processes for forming blends of matrix and reinforcing fibers in order to provide an intimately mixed blend prior to heating thereof- Such processes include carding, extrusion of two materials simultaneously so that the extrudates intermesh, feeding continuous fibers side-by-side to form a batt or mat and/or winding continuous reinforcing and matrix fibers together.

U.S. Pat. Nos. 4,874,563; 4,871,491; 4,818,318; and 4,799,985, all to McMahon, et al. disclose methods for preparing composite fiber blends wherein separately provided tows of thermoplastic fibers and reinforcing fibers are uniformly spread and thereafter the uniformly spread tows are brought into contact with each other and intimately admixed together. According to these patents, good wetting of the reinforcing fibers by the thermoplastic material is obtained when appropriate heat and pressure are applied to the mixed tow because of the substantially uniform distribution of the thermoplastic fibers and the reinforcing fibers within the fiber blend.

Although intimately admixed and uniformly blended mixtures of reinforcing fibers and thermoplastic matrix fibers are capable of producing high quality composite products, the various process steps and process control necessary to ensure the formation of a blend having both types of fibers uniformly distributed throughout the blend can increase the complexity of the processes for preparing the blends and/or the manufacturing cost associated therewith.

SUMMARY OF THE INVENTION

This invention provides a process for preparing an engineered blend of fibers wherein a plurality of separate yarns of thermoplastic fibers are blended with a spread tow of reinforcing fibers, such as carbon fibers. It has been found according to the invention that good wetting of reinforcing fibers is obtained during the composite article forming process.

The process of the invention is conducted by forming a substantially planar, spaced array of substantially parallel, continuous thermoplastic multifilament yarns wherein each of the multifilament yarns is substantially discrete and each is spaced from its adjacent yarns in the array by an amount substantially greater than the width of the individual, discrete yarns. At the same time, a tow of reinforcing fibers, such as carbon fibers, glass, quartz or other fibers, is spread to provide a substantially planar spread tow of the reinforcing fibers. The spread tow of reinforcing fibers and the array of thermoplastic multifilament yarns are prepared such that the array of multifilament yarns has a width at least about 50%, and preferably 70% or more of the width of the spread tow of reinforcing fibers. The substantially planar spaced array of thermoplastic yarns is continuously superimposed onto the substantially planar spread tow of reinforcing fibers to thereby continuously combine the superimposed array of thermoplastic yarns with the spread tow of reinforcing fibers into a substantially planar mixed yarn of reinforcing fibers and thermoplastic yarns. The substantially planar mixed yarn is thereafter gathered into a continuous tow useful in the preparation of composite molded articles.

The process of the invention typically results in a mixed yarn tow wherein the thermoplastic yarn and reinforcing fibers are not uniformly mixed; thus, when the reinforcing fibers and thermoplastic yarns are of different colors, the tow produced by the process of the invention typically evidences non-uniform coloring across its cross section. Nevertheless, the use of a spaced array of thermoplastic yarns ensures that the thermoplastic yarns are distributed throughout the yarn bundle, albeit non-uniformly. Despite the non-uniform dispersion of thermoplastic filaments throughout the reinforcing fibers, the tows prepared according to the subject invention are capable of producing excellent composite fiber-reinforced articles using substantially identical composite article forming techniques as are used with more uniformly blended tows.

Advantageously the spaced array of thermoplastic yarns is formed using one or more separator rolls having a plurality of spaced circumferential grooves for receiving individual thermoplastic yarns and for maintaining the yarns spaced from each other by a predetermined distance of for example, about 0.20 to about 1.0 inch. In one embodiment of the invention, one array of, for example, 5–10 thermoplastic yarn lines are superimposed onto one side of a spread tow of reinforcing fibers. In another preferred embodiment of the invention, two separate spaced arrays of thermoplastic yarns are superimposed onto opposed sides of the spread tow of reinforcing fibers to form a sandwich structure having the spread tow of reinforcing fibers between the arrays of thermoplastic fibers. The use of separator rolls in accordance with the invention provides for the preparation of the spaced arrays in an accurate and control e manner while minimizing damage to the yarns and improving process runability.

The process of the invention provides for the formation of blended tows of thermoplastic yarns and reinforcing fibers in a relatively straightforward manner without requiring substantial apparatus investment. High quality composite products and components are readily formed from the blended yarns of the invention despite the non-uniformity of the tows prepared according to the invention.

BRIEF DESCRIPTION OF THE DRAWINGS

In the drawings which form a portion of the original disclosure of the invention.

Detailed Description of the Preferred Embodiment

In the following detailed description, preferred embodiments of the invention are described in order to enable practice of the invention. Although specific terms are used in describing the preferred embodiments, it will be apparent that these are used in the descriptive sense only and not for purposes of limitation. It will also be apparent that the invention is susceptible to numerous changes and modifications within the spirit of the invention.

Figure 1:
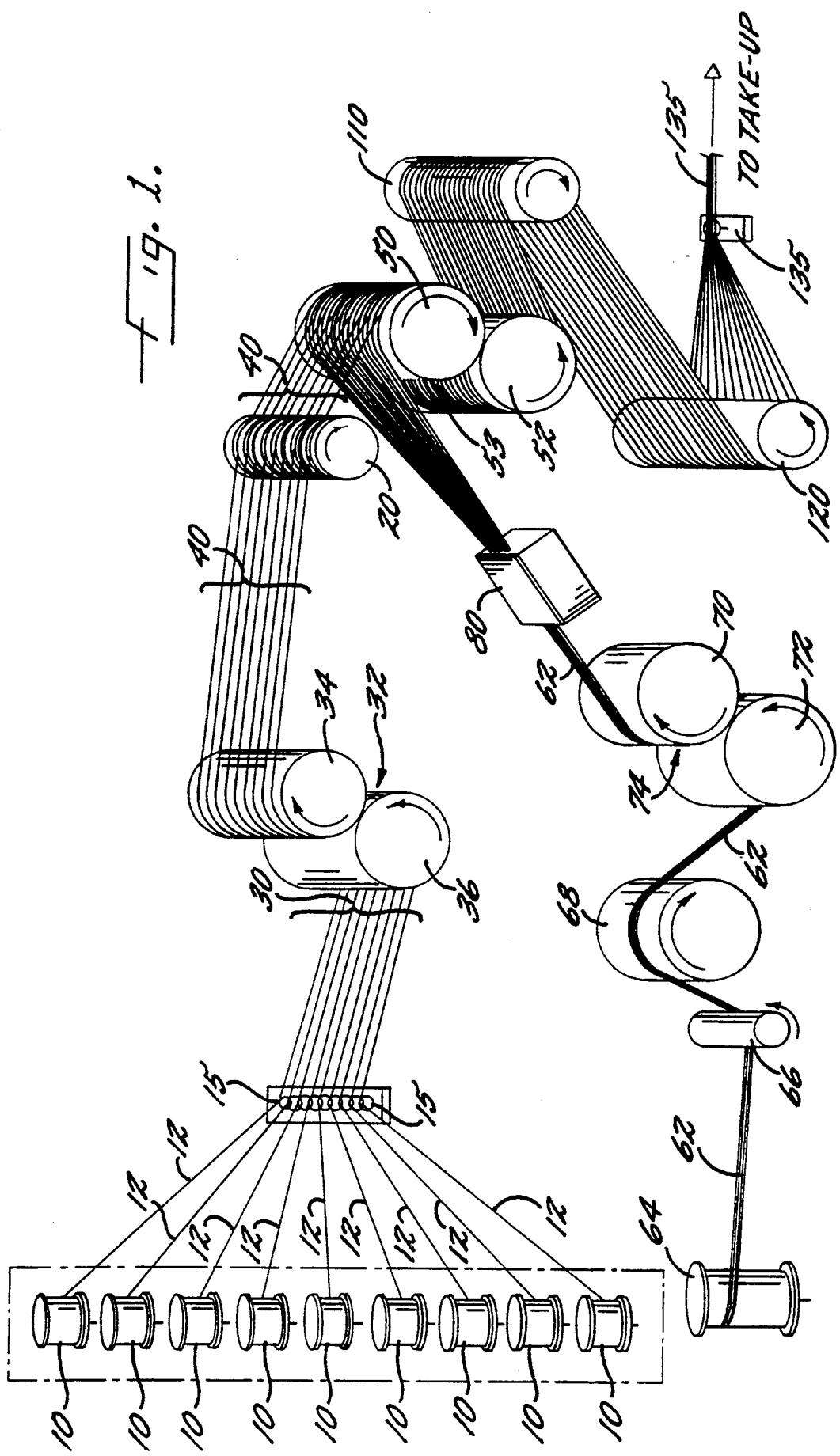
FIG. 1 illustrates one preferred process embodiment of the invention wherein a single array of spaced, thermoplastic yarns is superimposed onto a spread tow of reinforcing fibers.

FIG. 1 illustrates one preferred process embodiment of the invention wherein a plurality of bobbins 10 of thermoplastic fibers are advantageously supported on a creel (not shown). The thermoplastic fibers can be chosen from numerous thermoplastic fiber-forming polymers including polyesters; such as polyethylene terephthalate, polybutylene terephthalate and the like; wholly aromatic polyesters; polyethylene; polypropylene; polyamides such as nylon 6 and nylon 6,6; polyimides; polyether ester ketones such as PEEK; polyetheresters; and the like. In order to form a matrix polymer in the composite articles prepared from the blended tows of the invention, the thermoplastic polymer must have a melting temperature which is lower than the melting or thermal degradation temperature of the reinforcing fibers (discussed below). The choice of fibers and melting point of the fibers will be based on the intended application and operating environment for the final, consolidated composite product as will be apparent to the skilled artisan.

The bobbins 10 contain thermoplastic fibers in the form of multi-filament yarns wherein each yarn has a filament count ranging from about 15 to about 300 total filaments, depending upon the type of thermoplastic fiber, the denier per filament (dpf), the number of yarns, and like factors as will be apparent to those skilled in the art, Advantageously, the total denier for each of the multi-filament yarns supplied from bobbins 10 will be within the range of between about 50 and about 2000, preferably between 100 and about 1000.

A plurality of, for example from about 5 to about 15 or more separate threadlines 12, each corresponding to an individual bobbin 10 are fed through a plurality of static fiber guides 15 which are preferably pigtails, although slotted guides, ceramic guides or the like can also or alternatively be employed where desirable. These guides serve to maintain the multi-filament yarn threadlines 12 separately from each other and to guide the individual yarns to nip rolls.

The array 30 of multifilament yarns is next passed through the nip 32 formed between two rotating rolls 34 and 36. These rolls provide tension control for the array of thermoplastic yarns which is to be superimposed onto the reinforcing filaments as discussed below. The rolls 34 and 36 may include metal and/or elastomeric surfaces so that adequate tension control is applied during passage of the array 30 through the nip 32 formed between the contacting surfaces of the rolls 34 and 36. The array of thermoplastic yarns 40 exiting the tension control rolls 34 and 36 exhibits a predetermined and uniform tension such that the tension of each of the threadlines 12 making up the array 40 is substantially the same as the tension on each of the other threadlines 12 within the array 40. Preferably, each of the threadlines 12 within the array 40 exhibits a positive tension of greater than about 3 grams per denier which aids in maintaining the proper alignment and positioning of each threadline within the array. On the other hand, the tension on each threadline is advantageously sufficiently low that the fibers within the threadline are not elongated, i.e., stretched, due to the tension on the threadline.

Figure 3:
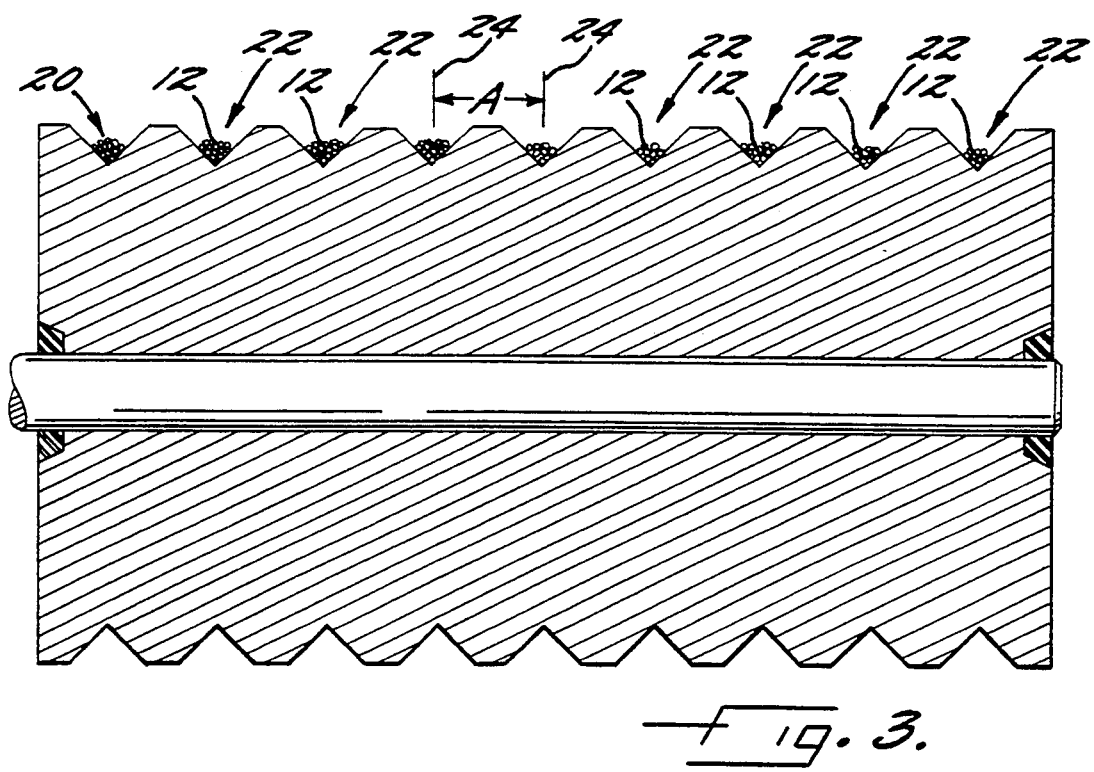
FIG. 3 is a cross sectional view of a grooved separator roll taken along line 3—3 of FIG. 1.

The spaced array 40 is thereafter passed across a grooved separator roll 20. The separator roll 20 directs and maintains the threadlines 12 into an array 40 at a predetermined spacing between the threadlines and such that the threadlines 12 are in substantially parallel alignment and in substantially planar form. Grooved separator roll 20 is shown in cross-section in FIG. 3. The separator roll includes a plurality of circumferential grooves 22 which preferably have a V-shaped cross-section for receiving the individual multi-filament yarn threadlines 12. The individual grooves 22 on the circumferential roll are spaced so that the center of each groove 24 is spaced from the center 24 of the adjacent groove 22 by a predetermined amount, A, which typically ranges from about 0.10 inch to about 0.7 inch depending upon the denier, number of filaments and type of yarn constituting threadline 12 and the width of the banding jet (discussed below).

The plurality of threadlines 12, exit separator roll 20 as an array 30 of multifilament yarns. The array 30 of yarns is substantially planar and each of the multifilament yarn threadlines 12 within the array 30 is spaced from the adjacent threadlines in the array 30 by a predetermined amount as determined by the spacing of the grooves 22 in the separator roll 20. Spacing between the individual multifilament yarns is substantially greater than the individual yarn cross-section. In preferred embodiments of the invention, the spacing between the individual yarns typically ranges from about 0.10 to about 0.50 inch, preferably from about 0.2 to about 0.5 inch. The array 40 exiting the separator roll 20 is thereafter directed to a second pair of counter rotating rolls 50 and 52 wherein it is superimposed upon a spread tow of reinforcing fibers, discussed in greater detail below.

The formation of spread tow of reinforcing fibers is illustrated in the bottom portion of FIG. 1. A single tow line 62 of reinforcing fibers is fed from a separate supply 64 to a pair of pretensioning and guide rolls 66 and 68. The tow of reinforcing fibers can constitute any of various well known reinforcing fibers including carbon fibers, glass fibers, boron fibers, boron nitride fibers, silicon carbide fibers, silicon nitride fibers, alumina fibers, aramid and like fibers, formed from ceramic, metallic, and/or of other inorganic and carbon-based materials in amorphous, crystalline, and polycrystalline form. The preparation of yarns and tows of such reinforcing fibers is well known to those skilled in the art. Any of such various well known fibers can be used herein so long as the reinforcement fibers are supplied in substantially continuous form, that is, as continuous filaments or yarns. The tow 62 typically has a total denier of greater than about 750 den., preferably greater than about 7,000 den., and a total filament count ranging from about 150 to about 24,000, preferably from about 3,000 to about 12,000. As is known to the skilled artisan, the total denier and denier per filament of the reinforcing fibers contained in the tow 62 will depend to a large extent upon the nature and chemical composition of the reinforcing fibers.

In addition, the quantity of fibers within the tow 62 is balanced with the quantity of fibers within the spaced array 40 of the thermoplastic fibers. In general, the weight of reinforcing fibers within tow 62, based on the weight of fibers within the array 40 of thermoplastic fibers can range from about 10 wt. %, up to about 200 wt. %, and preferably can range from about 30 wt. % up to about 50 wt. %, again depending upon the form and chemical composition of the reinforcing fibers and the thermoplastic fibers blended according to the invention.

Figure 4:
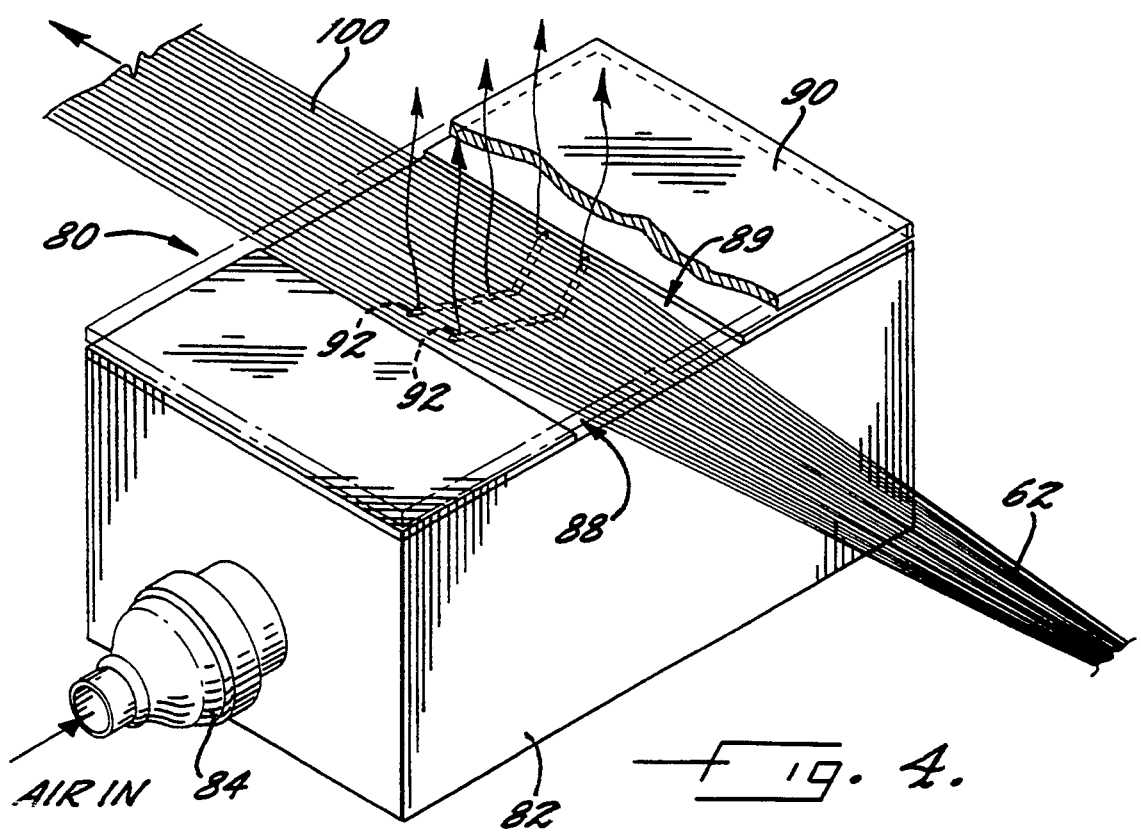
FIG. 4 is a partially broken away prospective view illustrating a banding jet which is used to spread a tow of reinforcing fibers in preferred embodiments of the invention.

Returning to FIG. 1, the pretension and guide rolls 66 and 68, which are optional, can be useful in order to guide the tow to a downstream tensioning roll system including a pair of tension rolls 70 and 72 which are arranged to form a nip 74. The tow line 62 is passed through nip 74 of rolls 70 and 72 in order to provide a minimum tension to the tow line 62 which exits the nip 74. The tow is then passed through a tow spreading device 80 which spreads the tow substantially uniformly into a substantially planar form. A preferred spreading device 80 is a spreading or banding jet as illustrated in FIG. 4. With reference to FIG. 4, the banding jet is known in the art and includes a container or box 82 for receiving a gas, such as air, supplied under pressure through a nozzle 84. Preferably, the gas is fed into the container 82 at a pressure of between about 0.5 to about 12 psig.

The tow 62 of reinforcing fibers is fed through a substantially planar entrance port 88 which forms a portion of a substantially planar channel 89 formed between the top 90 and the container body 82 of the spreading jet. Within the channel 89 one or more V-shaped ports 92 are provided for the impingement of gas from the container body 82 substantially perpendicularly onto the reinforcing fibers passing through channel 89.

As illustrated in FIG. 4, the tow of reinforcing fibers 62 is spread into a substantially planar and uniformly spread tow 100, as the tow passes through the jet 80. In general, the air supplied via ports 92 causes the reinforcing fibers in the tow 62 to vibrate and be spread to the full width of the channel 89 provided within the spreading jet device 80.

It will be apparent to the skilled artisan that other fiber tow spreading devices and/or methods can be substituted for the preferred banding jet spreading apparatus illustrated in FIG. 4. Thus, other devices for impinging a gas, such as air, in a generally perpendicular manner onto a tow of reinforcing fibers can also be employed in this invention. Preferably, a source of forced air is employed in order to spread the tow of reinforcing fibers in order to minimize any possible damage to the fibers within the tow.

Returning once more to FIG. 1, the spread tow of reinforcing fibers 100 passes from the spreading device 80 and onto a combining roll 50 wherein the array of thermoplastic fibers 40 is superimposed on top of the spread tow of reinforcing fibers. In general, the width of the spread tow of reinforcing fibers based on the width of the array 40 of the thermoplastic fibers, is within the range of between about 100% to about 150%. Preferably, the width of the substantially planar, spread tow 100 of reinforcing fibers is equal to or greater than the width of the array 40 of thermoplastic fibers and is within the range of between about 100% and about 125% of the width of the array 40 of thermoplastic fibers.

The spaced array 40 of thermoplastic fibers is superimposed onto the spread tow 100 of reinforcing fibers at combining rolls 50 and 52. Preferably, the superimposed layers of fibers are thereafter further combined at the nip 53 of rolls 50 and 52 and may be passed across a set of tensioning rolls 110 and 120. The combined layers are thereafter gathered by a conventional gathering device 130 which is preferably a pigtail or other gathering device such as a grooved roll. It may be desirable to apply a finish such as distilled water or a finish made from or compatible with the matrix polymer to the tow, just prior to gathering of the tow, by a kiss roll or other means not shown.

The tow of blended fibers 135 contains the thermoplastic yarns distributed throughout the reinforcing fibers such that the two types of fibers are in intimate contact. However, in most cases the thermoplastic fibers, although spread throughout the reinforcing fibers, are not uniformly distributed within the blended tow 135. Thus, typically the tow contains groups of thermoplastic fibers adjacent groups of reinforcing fibers and thus, the cross-section of the tow is non-uniform when viewed on a filament level. Nevertheless, as indicated previously, it has been found that the tows of the invention produce excellent reinforced composite articles.

The process illustrated in FIG. 1 employs separate pretensioning roll systems for the thermoplastic and reinforcing fibers. As discussed in conjunction with FIG. 2, such separate pretension roll systems are optional. However, this system allows different amounts of tension to be applied to the thermoplastic filaments and the reinforcing fibers, which may be necessary or desirable in some instances.

Figure 2:
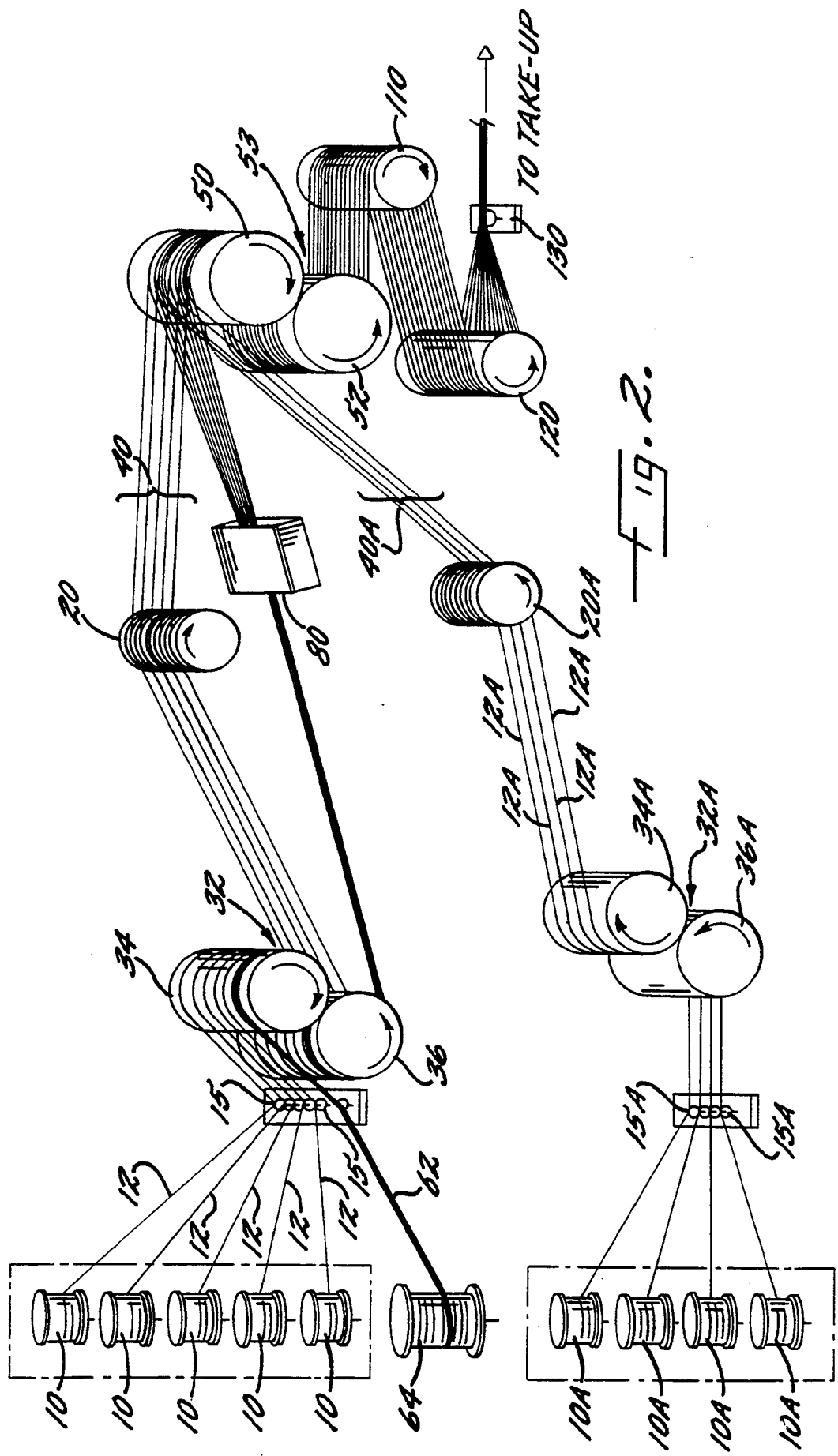
FIG. 2 schematically illustrates another preferred embodiment of the invention wherein two separate spaced arrays of thermoplastic yarns are superimposed on top of and underneath a spread tow of reinforcing fibers.

FIG. 2 illustrates another preferred embodiment of the invention and also illustrates preferred variations of the process, some of which can be used in the process illustrated in FIG. 1. In the embodiment illustrated in FIG. 2, two separate spaced arrays of substantially parallel thermoplastic yarns are formed and are superimposed both above and below a substantially planar, spread tow of reinforcing fibers. With specific reference to FIG. 2, thermoplastic fibers in the form of multi-filament yarns are fed as separate threadlines 12 from a first group of bobbins 10, which may be in the form of a creel, to a group of static guides 15, which may be pigtails as discussed in connection with FIG. 1. The separate yarns are fed to the nip 32 of a pair of tensioning rolls 34 and 36 to ensure proper tension control on the separate multifilament thermoplastic yarns fed from bobbins 10. A single tow line 62 of reinforcing fibers is supplied from a source 64 and fed to the same tension rolls 34 and 36. The reinforcing fibers in tow line 62 may be fed to the same or different circumferential portions of the tension rolls 34 and 36; thus, the reinforcing fibers in tow 62 may contact the thermoplastic fibers as the two different types of fibers pass through the nip 32 of tension control rolls 34 and 36.

The thermoplastic threadlines 12 are directed from the tension control rolls 34 and 36 to a grooved separator roll 20 which is constructed identically with the separator roll illustrated in FIG. 1. Advantageously, the separate threadlines 12 of thermoplastic multifilament yarns are received in spaced apart grooves 22 (FIG. 3) of the roll such that there are empty grooves between each of the grooves that receives a threadline. Thus, the yarns are received, for example, in the first, third, fifth, seventh, ninth and eleventh grooves on the separator roll. The tow 62 of thermoplastic fibers exiting tension control rolls 34 and 36 is directed to a tow spreading device 80 which is advantageously the gas banding jet illustrated in FIG. 4 for spreading of the tow 62 of reinforcing fibers into a substantially planar spread tow 100. Simultaneously, a plurality of multifilament yarns from a separate group of bobbins 10A are fed through a separate group of fiber guides 15A to the nip 32A of a second set of tension control rolls 34A and 36A. The separate multi-filament threadlines 12A are fed to a second grooved separator roll 20A and are received in separate grooves in the separator roll to thereby from a second array 40A of thermoplastic multi-filament yarns. Each of the two arrays 40 and 40A may contain from about 3 to about 15 or more threadlines. Advantageously, the threadlines 12A are received in grooves within separator roll 20A which are circumferentially aligned with the empty grooves in guide roll 20. Thus, when the separate arrays 40 and 40A of thermoplastic yarns are superimposed over and under the spread tow of reinforcing yarn 100, the yarns within array 40A are positioned parallel to and laterally between the yarns in the array 40.

The sandwich structure having the separate arrays 40 and 40A of thermoplastic yarns superimposed above and below the spread tow 100 of reinforcing fibers is fed through the nip 53 of the combining rolls 50 and 52. The sandwich, substantially planar structure is then passed via rolls 110 and 120 to a gathering device 130, such as a pigtail wherein the substantially planar structure is gathered into a continuous tow. The tow, to which may be applied a finish as before, is then wound up by a conventional means, As is apparent from FIG. 2, the spaced array of thermoplastic multi-filament yarns used in the process of the invention can be formed in preferred embodiments of the invention using only a single separator roll downstream of a tension control means, such as pair of contacting rolls. Likewise, the same set of tension control rolls can be used to impart tension to a tow of matrix fibers as is used to impart tension to separate thermoplastic multi-filament yarns. When the same set of tensioning rolls are used for the thermoplastic yarns and for the reinforcing tow, the tension applied to the thermoplastic yarns will be substantially identical to the tension applied to the tow of reinforcing yarns. On the other hand, the arrangement of FIG. 1 wherein different feed and tensioning rolls are employed to feed the thermoplastic yarns and the reinforcing fiber tow, allows for different degrees of tension to be imparted to the thermoplastic yarns as compared to the reinforcing fiber tow. Preferably, in all embodiments of the invention both the reinforcing fibers and the thermoplastic yarns are maintained under a relatively low positive tension, for example, between about 3 and about 4 grams per denier. As indicated previously, applying a slightly greater tension to the thermoplastic yarns can improve the formation and maintenance of the array of thermoplastic yarns which are superimposed on the spread tow of reinforcing yarns in some instances.

The blended tows formed in accordance with the invention are used in the conventional manner to form composite articles and/or structures. For example, the blended tow can be wrapped around a mandrel and/or placed into a mold and thereafter heated to the melting temperature of the thermoplastic polymer. Heating of the thermoplastic polymer causes the thermoplastic polymer to liquify and to flow into and around the reinforcing fibers. In many instances, it is desirable that heating be conducted while the thermoplastic and reinforcing fiber blend is maintained under pressure. Heating may be conducted using any suitable method including conduction heating, convection heating and/or radiant including microwave energy to accomplish melting of the thermoplastic polymer.

The fiber tows prepared according to the invention may also be used to prepare woven fabrics, either alone, or in combination with other fibers and/or fiber blends in order to produce fabrics which can be heated to form composite articles. The construction of such woven fabrics is known to those skilled in the art.

The following examples served to illustrate practice of the invention. They are not intended as limitations on practice of the invention.

EXAMPLE 1

In this example, the process of the invention was conducted substantially as shown in FIG. 1. Nine separate multifilament yarns of polybutylene terephthalate polymer were used. Each multifilament yarn consisted of 66 filaments having a total denier of 425. The reinforcing fiber tow consisted of a carbon fiber tow including about 12,000 total filaments and having a total denier of about 7,100.

The feed and tension control rolls feeding the 9 separate thermoplastic yarns were driven at a speed of 119.8 ft/min. The separator roll was allowed to freely rotate and the combining rolls were rotated at a speed of 120 ft/min. The carbon fiber tow was fed through feed and tension control rolls rotated at a speed of 121.5 ft/min. The carbon fiber tow was spread to a width of approximately 3 inch as it passed through a banding jet essentially shown in FIG. 4 which received air at a pressure of 3 to 5 psig. The thermoplastic yarns were formed into array having a width of approximately 2.5 inch such that there was a spacing of approximately 0.25 inch between adjacent individual multifilament yarns. The array of multifilament yarns was superimposed onto the spread tow of carbon fibers using the combining rolls system illustrated in FIG. 1. A finish consisting of distilled water was applied to the planar blend of fibers and the tow was gathered using a Roller Guide. The thus formed tow was wound using a LESSONA winder.

A unidirectional test panel was consolidated at the following conditions:
Time: 35 min.
Temp.: 240° C.
Pressure: 135 psig The panels consolidated under these conditions had good surface finish indicating good wet-out of the matrix. Using ASTM method D790-86 the flex strength is 143 Ksi; the flex modulus is 11.43 mpsi.

EXAMPLE 2

In this example, the process and apparatus setup essentially shown in FIG. 2 was used. Nine separate multifilament polybutylene terephthalate yarns, each having the same total denier and number of filaments per yarn as in Example 1 were used. Four of the yarns were formed into an array having an approximate width of 1.25 inch and an approximate spacing between yarns of 0.3 inch. This array was superimposed onto the top of the spread tow of carbon fibers as illustrated in FIG. 2. The remaining 5 multifilament polybutylene terephthalate yarns were formed into an array having a width of approximately 2.5 inch and a spacing between yarns of about 0.5 inch and this array was superimposed onto the bottom of spread carbon fiber tow essentially as shown in FIG. 2. The carbon fiber tow was passed through the banding jet essentially as illustrated in FIG. 4 and was spread to a width of approximately 3.0 inch. A finish of distilled water was applied and the sandwich structure was gathered into a tow using a Roller Guide.

The tow prepared above was used to prepare panels in the same manner as in Example 1. The panels exhibited a good surface finish indicated good wet-out. The flex strength and flex modulus determined as in Example 1 are 154.4 Ksi and 15.09 mpsi, respectively.

The invention has been described in considerable detail with reference to its preferred embodiments. However, variations and modifications can be made within the spirit of the invention as described in substantial detail in the foregoing specification without departure from the scope of the invention as defined in the appended claims.

That which is claimed is:

1. A process for preparing a non-uniformly blended tow of thermoplastic and reinforcing fibers comprising:
   forming a substantially planar, spaced array of substantially parallel, continuous thermoplastic multifilament yarns wherein each of the multifilament yarns is substantially discrete and is spaced from adjacent yarns in the array by an amount substantially greater than the width of the individual, discrete multifilament yarns;
   spreading a tow of reinforcing fibers to provide a substantially planar spread tow of said reinforcing fibers wherein said array of multifilament yarns has a width of at least about 50% of the width of said spread tow of reinforcing fibers;
   continuously superimposing said substantially planar spaced array of thermoplastic fibers onto said substantially planar spread tow of reinforcing fibers to thereby continuously combine said superimposed array and said spread tow into a substantially planar non-uniformly mixed yarn; and
   gathering said substantially planar non-uniformly mixed yarn into a tow of non-uniformly blended reinforcing fibers and thermoplastic yarns.

2. The process of claim 1 wherein said array of thermoplastic yarns has a width which is the same or less than the width of the spread tow of reinforcing fibers.

3. The process of the claim 1 wherein said array of thermoplastic yarns has a width of at least about 70% of the width of the spread tow of reinforcing fibers.

4. The process of claim 1 wherein each of the multifilament thermoplastic yarns within the said array of thermoplastic yarns is maintained at substantially the same tension.

5. The process of claim 1 wherein said reinforcing fibers are selected from the group consisting of carbon fibers, glass fibers, boron nitride fibers, silicon carbide fibers, silicon nitride fibers, alumina fibers and aramid fibers.

6. The process of claim 1 wherein said thermoplastic fibers are selected from the group consisting of polyester fibers, wholly aromatic polyester fibers, polyethylene fibers, polypropylene fibers, polyamid fibers, polyimide fibers, polyetherester ketone fibers, and polyetherester fibers.

7. The process of claim 1 wherein the spacing between individual multifilament thermoplastic yarns within said array of thermoplastic yarns is between about 0.10 and about 0.95 inch.

8. The process of claim 1 additionally comprising the step of forming a second substantially planar, spaced array of substantially parallel, continuous thermoplastic multifilament yarns, each of said yarns in said second array being substantially discrete and spaced from the adjacent yarns by an amount substantially greater than the width of said yarns when in said array; and superimposing said second array onto the opposed side of said spread tow of reinforcing fibers.

9. The process of claim 8 wherein the yarns in said second arrray are positioned on said opposed side of said spread tow of reinforcing fibers such that the yarns of said second array are positioned laterally between the yarns of said first array.

10. A process for preparing a non-uniformly blended tow of reinforcing fibers and thermoplastic yarns comprising the steps:
    forming a substantially planar spaced array of substantially parallel discrete continuous thermoplastic multifilament yarns separated from each other by an amount substantially greater than the individual widths of said discrete yarns in said array by directing each of a plurality of thermoplastic yarns into contact with a separate circumferential groove on a rotating drum comprising a plurality of spaced circumferential grooves;
    spreading a tow of reinforcing fibers to provide a substantially planar spread tow of said reinforcing fibers;
    superimposing said spaced array of thermoplastic fibers onto one side of said spread tow of reinforcing fibers to thereby continuously combine said superimposed array with said spread tow to form a substantially planar non-uniformly mixed yarn; and
    non-uniformly gathering said substantially planar non-uniformly mixed yarn into a non-uniformly blended tow of thermoplastic yarns and reinforcing fibers.

11. The process of claim 10 wherein said spaced array of thermoplastic yarns is formed to have a width of at least about 50% the width of the spread tow of reinforcing fibers.

12. The process of claim 10 wherein said plurality of thermoplastic yarns are directed through the nip formed between a pair of opposing rolls prior to contacting said roll having a plurality of circumferential grooves.

13. The process of claim 10 wherein each of said plurality of thermoplastic yarns is fed through a separate static fiber guide prior to contacting said separate circumferential groove on said rotating drum.

14. The process of claim 10 wherein said step of spreading a tow of reinforcing fibers is conducted by passing a tow reinforcing fibers through a substantially planar closed channel and impinging forced gas perpendicularly onto said tow as it passes through said channel.

15. The process of claim 10 wherein said reinforcing fibers are selected from the group consisting of carbon fibers, glass fibers, boron nitride fibers, silicon carbide fibers, silicon nitride fibers, alumina fibers, and aramid fibers.

16. The process of claim 10 wherein said thermoplastic yarns are selected from the group consisting of polyester yarns, wholly aromatic polyester yarns, polyethylene yarns, polypropylene yarns, polyamide yarns, polyimide yarns, polyetherester ketone yarns, polyetherester yarns.

17. The process of claim 10 wherein the centers of adjacent grooves on said roll having a plurality of spaced circumferential grooves are spaced from each other in an amount of between 0.20 and about 0.50 inch.

18. The process of claim 10 additionally comprising the step of forming a second, substantially planar spaced array of substantially parallel continuous thermoplastic multifilament yarns by directing each of a second plurality of thermoplastic yarns into contact with a separate circumferential groove on a second rotating drum comprising a plurality of spaced circumferential grooves; and superimposing said second array of thermoplastic fibers onto the opposed side of said spread tow of reinforcing fibers.

19. The process of claim 18 wherein the yarns in said second array of thermoplastic yarns are positioned on said opposed side of said spread tow of reinforcing fibers such that the yarns of said second array are positioned laterally between the yarns of said first array.

20. The process of claim 10 additionally comprising the step of applying a finish or water to said substantially planar mixed yarn prior to gathering said substantially planar mixed yarn into a blended tow.

21. The process of claim 10 wherein said spaced array of thermoplastic yarns comprises between about three and about 15 multifilament yarns.

22. The process of claim 21 wherein said spaced array of thermoplastic yarns comprises at least four multifilament thermoplastic yarns.

23. The process of claim 18 wherein each of said arrays of thermoplastic yarns comprise between about three and about 15 thermoplastic yarns.

24. The process of claim 10 wherein the blended tow resulting from said gathering step comprises a non-uniform distribution of thermoplastic fibers throughout said tow.

25. The process of claim 18 wherein said blended tow produced by said gathering step comprises a non-uniform distribution of thermoplastic fibers throughout said tow.

* * * * *